United States Patent Office 3,300,321
Patented Jan. 24, 1967

3,300,321
PROCESS FOR THE MANUFACTURE OF IONIC BRIGHT-DRYING POLISH EMULSIONS AND WAXES TO BE USED IN THIS PROCESS
Guido von Rosenberg and Wolfgang Sapper, Gersthofen, near Augsburg, Germany, assignors to Farbwerke Hoechst Aktiengesellschaft vormals Meister Lucius & Bruning, Frankfurt am Main, Germany, a corporation of Germany
No Drawing. Filed Mar. 22, 1963, Ser. No. 267,360
Claims priority, application Germany, Mar. 30, 1962, F 36,423, F 36,424
9 Claims. (Cl. 106—6)

Ionic bright-drying polish emulsions can be produced by melting the waxes to be emulsified together with olein, adding to the melt, at a temperature of about 100° C., aqueous amine solutions while stirring and terminating the emulsification by stirring in boiling water. This emulsification is called "water-in-wax process."

Alternatively, it is possible to stir the partially emulsified mixture of molten wax, olein and aqueous amine solution into boiling water, this being the so-called "wax-in-water" process.

In the manufacture of bright drying polish emulsions from bright-drying waxes containing non-ionic emulsifiers a third process is known which is defined in the following as "interspersion process." This process consists in interspersing the wax to be emulsified and containing the emulsifier, without previous melting, in boiling water while stirring, in the form of flakes, powder or other small pieces. This process requires neither mixing nor melting and is thus very simple to carry out in practice. A disadvantage is, however, that it is only suitable for the manufacture of non-ionic bright drying polish emulsion.

It has now been found that ionic bright drying polish emulsions can be produced from waxes and amines with the concomitant use of alakali metal hydroxides and eventually olein or other fatty acids having an emulsifying action in the form of their amine soaps when waxes having an acid number in the range of 65 and 95 are added to boiling aqueous amine solutions containing alkali metal hydroxides. In this manner also ionic bright-drying polish emulsions can be produced according to the interspersion process.

Waxes which can be processed with special advantage without the use of olein are those which have an acid number in the range of 60 to 110 and preferably 80 to 90. The waxes can be used per se or in the form of mixtures, for example mixtures of waxes having different acid numbers; within the above limits the mixing ratio being adjusted to the optimum acid number in conformity with the emulsion formula in each case. Especially suitable are wax mixtures containing oxidized polyethylene waxes. Emulsions made with products of this kind produce an especially high gloss on drying which is well reproducible. The following waxes can be used as mixing components and partially as single waxes, too:

(a) chromic acid oxidation products of deresinified or nonderesinified crude montan wax;
(b) esters of these oxidation products and polyhydric alcohols of low molecular weight, preferably glycols, for example ethylene glycol, and
(c) oxidized polyethylene waxes.

Especially suitable are those oxidized polyethylene waxes which are obtained by air oxidation of waxy polyethylenes having a molecular weight of about 1,000 to 4,000, preferably 2,000 to 3,000, to an acid number of 40 to 80, preferably 50 to 70, and subsequent chromic acid oxidation of the air oxidation products to an acid number in the range of 80 to 130, preferably 90 to 120. These products have a saponification number of 110 to 150, preferably 120 to 140, a penetration number of less than 3, preferably of about 1, and a flow point/drop point of 105 to 120° C., preferably 110 to 118° C.

From among the products of this kind there are particularly suitable those which have been prepared from waxy low pressure polyethylenes having the aforesaid characteristics. The polyethylenes may be obtained by thermal degradation of low pressure polyethylenes of high molecular weight. Oxidized polyethylene waxes which have been prepared by an air-chromic acid oxidation as described above can only be used in admixture with waxes having a melting point below 100° C. because of their flow point/drop point above 100° C. Irrespective of the necessary adjustment to the optimum acid number as described above, the mixing ratio must be chosen so that the wax mixture melts at a temperature below the boiling point of water. This latter condition is essential in the process of the invention. As components to be mixed with the oxidized polyethylene waxes there can be used, for example, the ester waxes on the basis of crude montan wax described sub(b). Mixtures of this kind have the advantage of a reliable workability and a complete emulsifiability.

Especially suitable waxes for ionic bright drying polish emulsions are also obtained when ester waxes on the basis of crude montan wax having an acid number in the range of 60 to 110 are admixed with oxidized polyethylene waxes, the amount and acid number of the latter being chosen in a manner such that the products obtained from ester waxes and polyethylene waxes have likewise an acid number in the range of 60 to 110.

As oxidized polyethylene waxes there can be used commercial products having, for example, an acid number of 6 to 45. Particularly suitable are those oxidized polyethylene waxes which are obtained by oxidizing with air polyethylenes having a molecular weight in the range of 1,000 to 4,000, preferably 2,000 to 3,000, to an acid number of 40 to 80, and then further oxidizing the air oxidation products with chromic acid to an acid number of 60 and 110.

Waxes or wax mixtures of the type specified above cannot be emulsified alone by the usual processes to yield ionic bright drying polish emulsions. When treated according to the process of the invention they yield, however, bright drying polish emulsions.

The emulsification according to the invention can be carried out in the following manner:

The total amount of water containing the alkali metal hydroxides and amines are first introduced into the reaction vessel, heated to boil and the waxes are added. Alternatively, part of the water, for example about 60% of the total amount of water used, can be first introduced into the reaction vessel, heated to boil and rendered weakly alkaline with a small amount of alkali metal hydroxides, preferably caustic potash. The amount of amine required for the emulsification, which amount has previously been determined by a test, is stirred in, if desired in the form of an aqueous solution. After having been added to the aqueous phase, the amine shall be present in a concentration of 1 to 3% by weight. Subsequently, the wax is added to the aqueous solution while stirring. The emulsification being terminated, the residual amount of water, necessary for adjusting the desired wax content, is introduced while boiling. It is suitable to emulsify about 10 to 15 parts by weight of wax in 85 to 90 parts by weight of water.

It is likewise possible to dissolve part of the necessary amount of substances having an alkaline reaction in boiling water, to add the wax to be emulsified, to start emulsification and then to add the residual amount of substances of alkaline reaction. For example, the alkali metal hydroxides can be dissolved in boiling water, the wax can be added and the emulsification can be terminated by stirring in the amine.

The wax is preferably stirred into the aqueous phase in finely divided solid form. The shape of the wax particles is not critical. The individual particles should not have a size above 10 mm. It is thus possible to use wax flakes, granules or powder. Alternatively, molten wax can be stirred into the aqueous phase, but in this case an essential advantage of the present process is not made use of.

At the beginning of the emulsification the wax to be emulsified comes into contact with an excess amount of alkaline substances. As compared therewith, in the known processes these substances are present at the beginning of the emulsification in a deficiency with respect to the wax.

The wax to be emulsified may contain olein or not. It is more suitable to process waxes which are free of olein because olein-containing waxes are more difficult to comminute and on the transport the comminuted waxes tend to agglomerate under their own weight. Moreover, waxes which are free from olein yield harder films on the floor than waxes containing liquid olein, and the harder films are more resistant to mechanical wear and take up less dirt.

The emulsification is facilitated if small amounts of rosin, for example 1–5%, are added to the wax to be emulsified before it is reduced to flakes, powder or other small pieces. When wax mixtures of ester waxes on the basis of crude montan wax and oxidized polyethylene waxes are used, it is suitable to add 2 to 6% of balsamic rosin.

A suitable amine is aminomethylpropanol. It is likewise possible, however, to use other amines already employed in the manufacture of bright-drying polish emulsions, provided that they are not too volatile with steam.

For assisting the action of the amine in the formation of the emulsifying soaps from the amines and the carboxyl group-containing components of the waxes, it is necessary to use alkali metal hydroxides. When caustic potash is used for the manufacture of an emulsion having a wax content of 11%, the maximum amount required is 0.4% g. for 100 grams of emulsion. The amount can be raised proportionally when emulsions having a higher wax content are produced. In general, the amount of alkali need not exceed 0.4% by weight, calculated on the aqueous phase.

Like ionic bright-drying polish emulsions prepared by known processes, the bright-drying polish emulsions of the invention are compatible with all additives for example ammoniacal solutions of special resins for bright-drying polish emulsions and plastic dispersions, for example polystyrene or polyacrylate dispersions, which are generally added to ionic bright-drying polish emulsions for improving their wetting and flowing properties as well as the film-forming properties.

The following examples serve to illustrate the invention, but they are not intended to limit it thereto.

*Example 1*

In 600 grams of distilled boiling water were dissolved first 2 grams of caustic potash and then 12 grams of aminomethylpropanol. Immediately thereafter, 103 grams of a pulverulent ester wax were gradually strewn into the solution while mechanically stirring continuously. The wax was the ethylene glycol ester of an oxidation product of non deresinified crude montan wax with chromic acid. The ester wax had an acid number of 80. Prior to pulverization, 3 parts of rosin had been added to 100 parts of ester wax.

When the emulsification, which had been carried out while continuously boiling, was terminated, further 283 grams of boiling water were stirred in. The emulsion cooled to room temperature had a transparent appearance. 200 grams of a 10% ammoniacal solution of Shanco resin 334 (an American special resin for bright-drying polish emulsion on the basis of meleinate) were added to the emulsion and the gloss was tested in a gloss gauge according to Dr. Lange in a concentration of 25 g. per square meter on black packing rubber. The gloss on drying of the emulsion was 68%, compared with the gloss of a black glass plate of 100%. After the addition of 300 grams of a commercial 10% polystyrene dispersion (Ubatol 2007) the gloss on drying produced was 78%.

*Example 2*

In 873 grams of boiling distilled water were dissolved first 3 grams of caustic potash and then 14 grams of aminomethylpropanol. Immediately thereafter, 110 grams of a pulverized wax were gradually added while mechanically stirring continuously. The wax had the following composition:

97 grams of the ethylene glycol ester of an oxidation product of nonderesinified crude montan wax with chromic acid, the ester having an acid number of 80;
3 grams of rosin;
10 grams of oxidized commercial polyethylene wax having a melting point of 96° C. and an acid number of 26.

The emulsion, which had been cooled to room temperature was filtered to remove traces of nonemulsified substances and 150 grams of an 11% ammoniacal solution of Shanco resin 334 were added. The emulsion produced a gloss on drying of 80% which increased to 86% after the addition of 350 grams of an 11% Ubatol 2007 dispersion.

Instead of the polystyrene dispersion Ubatol 2007, a mixture thereof with a polyacrylate dispersion Ubatol 3050 was used. In this case, the gloss on drying remained constant but the films obtained were more resistant to water.

*Example 3*

In 870 grams of boiling distilled water were dissolved first 3 grams of caustic potash and then 14 grams of aminomethylpropanol. Immediately thereafter, 113 grams of a pulverized wax were added gradually while mechanically stirring continuously. The wax had the following composition:

58 grams of a chromic acid oxidation product of nonderesinified crude montan wax having an acid number of 120;
42 grams of an ethylene glycol ester of said oxidation product having an acid number of 27;
10 grams of an oxidized polyethylene wax having an acid number of 26;
3 grams of rosin.

The emulsion was filtered while hot and cooled. 150 grams of an 11% solution of Shanco resin 334 were added. The emulsion produced a gloss on drying of 66% which increased to 77% after the addition of 350 grams of an 11% dispersion of Ubatol 2007.

*Example 4*

In 870 grams of boiling distilled water were dissolved first 3 grams of caustic potash and then 14 grams of aminomethylpropanol. Immediately thereafter, 113 grams of a pulverized wax were gradually added, while mechanically stirring continuously. The wax had the following composition:

58 grams of a chromic acid oxidation product of nonderesinified crude montan wax having an acid number of 120;

52 grams of an oxidized polyethylene wax having an acid number of 26;
3 grams of rosin.

The emulsion was filtered while hot and cooled. 150 grams of an 11% solution of Shanco resin 334 were added. The product obtained produced a gloss on drying of 80%, which increased to 90% after the addition of 350 grams of an 11% dispersion of Ubatol 2007.

*Example 5*

In 853.5 grams of boiling distilled water were dissolved first 3.5 grams of caustic potash and then 17.0 grams of aminomethylpropanol. Immediately thereafter, 126.0 grams of a pulverized wax were added gradually, while continuously stirring. The wax had the following composition:

110.0 grams of the ethylene glycol ester of an oxidation product of a nonderesinified crude montan wax with chromic acid, the acid number of the ester was 93;
6.0 grams of rosin;
10.0 grams of a polyethylene wax oxidized first with air and then with chromic acid and having an acid number of 99, a saponification number of 128, a flow point/drop point of 112° C. and a penetration number of about 1.

150 grams of a 12% amoniacal solution of Shanco resin 334 were added to the transparent emulsion which had been cooled to room temperature and was entirely free from precipitations. The emulsion produced a gloss on drying of 68% which was increased to 83% by the addition of 350 grams of a 12% dispersion of Ubatol 2007.

*Example 6*

An oxidation product of non deresinified crude montan wax (oxidized with chromic acid, acid number 110) was esterified with ethylene glycol. The amount of glycol and the time of esterification were adjusted in a manner such that the product obtained after esterification had an acid number of 93.

To 128 kilograms of the product thus obtained there were added in the molten state 16 kilograms of a polyethylene wax which had been oxidized first with air and then with chromic acid and had an acid number of 68, a saponification number of 73.5, a flow point/drop point of 103.5° C. and a penetration number of about 1, and 7.2 kilograms of rosin, 151.2 kilograms of a bright-drying wax were obtained having an acid number of 94.

*Example 7*

An oxidation product of non deresinified crude montan wax (oxidized with chromic acid, acid number 112) was esterified with ethylene glycol, the amount of glycol and the time of esterification being adjusted so that the product obtained had an acid number of 80.

130 kilograms of the above product were admixed in the molten state with 14 kilograms of a polyethylene wax which had been oxidized first with air and then with chromic acid and had an acid number of 107, a saponification number of 136, a flow point/drop point of 114° C. and a penetration number of about 1, and 7.2 kilograms of rosin.

151.2 kilograms of a bright-drying wax were obtained having an acid number of 87.

We claim:

1. Process for the manufacture of a bright-drying polish emulsion which consists essentially of adding to a boiling aqueous solution of 1–3% by weight of aminomethylpropanol and up to 0.4% by weight of an alkali metal hydroxide, 10–15% by weight of a wax having an acid number between 60 and 110 and a melting point below the boiling temperature of said aqueous solution.

2. Process as defined in claim 1, wherein the wax is added to the aqueous solution in the form of finely divided solid particles.

3. Process as defined in claim 1, wherein the wax contains as an additive 1–5% by weight of rosin.

4. Process as defined in claim 1, wherein the wax is a mixture of (1) an ester wax obtained by treating montan wax with chromic acid, said ester wax having an acid number between 6 and 130, and (2) an oxidation product of a waxy polyethylene having a molecular weight of 1000–4000 and an acid number of 6–130.

5. Process as defined in claim 4, wherein the ratio of component (1) to component (2) is 100:5 to 100:20 parts by weight.

6. Wax suitable for the manufacture of bright-drying polish emulsions consisting essentially of a mixture of (1) an ester wax obtained by treating montan wax with chromic acid, said ester wax having an acid number between 60 and 110, and (2) an oxidation product of a waxy polyethylene having a molecular weight of 1000–4000 and an acid number of 6–130, said mixture having an acid number between 60 and 110, the ratio of component (1) to component (2) is 100:5 to 100:20 parts by weight.

7. Wax as defined in claim 6, consisting essentially of a mixture of (1) an ester of (a) a product obtained by treating a non deresinified montan wax with chromic acid and (b) ethylene glycol and (2) an oxidation product of a waxy polyethylene having a molecular weight of 1000–4000 and an acid number of 6–130.

8. Wax as defined in claim 6 consisting essentially of (1) an ester wax obtained by treating montan wax with chromic acid, said ester wax having an acid number between 60 and 110, and (2) a product obtained by oxidizing a polyethylene having a molecular weight between 1000 and 4000 in a first stage with air and in a subsequent stage with chromic acid to an acid number of 80–130.

9. An aqueous wax emulsion a layer of which forms upon evaporation of the water a bright wax film, said emulsion being obtained by adding to a boiling aqueous solution of an aminomethylpropanol present in a concentration of 1–3% by weight and an alkali metal hydroxide present in a concentration of up to 0.4% by weight, 10–15% by weight of a wax having an acid number between 60 and 110 and a melting point below the boiling temperature of said aqueous solution.

References Cited by the Examiner

UNITED STATES PATENTS

| | | | |
|---|---|---|---|
| 2,867,538 | 1/1959 | Bienefeld | 106—271 |
| 2,964,487 | 12/1960 | Chapman et al. | 106—10 |
| 3,004,856 | 10/1961 | Zinnert | 106—270 |
| 3,060,046 | 10/1962 | Kaupp et al. | 106—270 |
| 3,143,431 | 8/1964 | Kaupp et al. | 106—8 |

ALEXANDER H. BRODMERKEL, *Primary Examiner.*

L. HAYES, *Assistant Examiner.*